United States Patent [19]

Dutton

[11] Patent Number: 4,606,106

[45] Date of Patent: Aug. 19, 1986

[54] SEAL INSTALLATION TOOL

[76] Inventor: Ernest H. Dutton, Rte. 2, Box 363B, Smiths, Ala. 36877

[21] Appl. No.: 662,520

[22] Filed: Oct. 19, 1984

[51] Int. Cl.⁴ .............................................. B23P 19/04

[52] U.S. Cl. .......................................... 29/235; 29/267

[58] Field of Search ........................ 269/236; 254/131; 29/235, 267, 264, 251

[56] References Cited

U.S. PATENT DOCUMENTS

| | | |
|---|---|---|
| 357,584 | 2/1887 | Dudley . |
| 972,575 | 10/1910 | Schramm . |
| 1,286,449 | 12/1918 | Timmerman . |
| 1,400,783 | 12/1921 | Abernathy ............................ 29/267 |
| 2,441,756 | 11/1945 | de Swart . |
| 2,815,052 | 12/1957 | Krasnow ............................ 269/236 |
| 2,837,815 | 6/1958 | Schumann . |
| 4,286,368 | 9/1981 | Magana . |

FOREIGN PATENT DOCUMENTS 799 of 1895 United Kingdom ................ 269/236

*Primary Examiner*—Robert C. Watson
*Attorney, Agent, or Firm*—Burns, Doane, Swecker & Mathis

[57] ABSTRACT

A seal installation tool is provided which comprises a yoke having a curved, lower camming surfaces and a handle, an apertured block rotatably secured within the yoke and a collar piece which is separate from the handle and the block. The apertures of the collar and the block are sized to slidingly receive a shift linkage piece extending from a transmission casing. The block is further provided with a set screw for securing the block to the linkage piece. A hole through an arm of the yoke provides access to the head of the set screw.

7 Claims, 7 Drawing Figures

SEAL INSTALLATION TOOL

FIELD OF INVENTION

The present invention relates generally to tools for installing seals and more particularly to tools for installing oil retention seals in automatic transmissions of automobiles.

BACKGROUND OF THE INVENTION

The shift linkage of many automobiles having automatic transmissions includes a piece of shafting which extends through a port in the transmission casing. A seal is provided between the shaft and the adjacent positions of the casing which prevents fluid within the transmission from escaping. The seal usually comprises an inner annulus of pliable material for bearing against a circumference of the shaft and a rigid, usually metal, outer annulus for supporting the inner annulus. In most constructions of this seal, the outer annulus is provided with an inwardly directed lip which is radially spaced apart from the shaft by the inner annulus.

When the subject seals begin to leak or are otherwise in need of replacement, the practice has been to disassemble the transmission to the extent required for gaining access to the seal thru the interior of the trans case-ing. Such work, however, is extremely time consuming and expensive. Moreover, the removal, disassembly and reconstruction of a transmission is often beyond the expertise and capacities of the ordinary home mechanic. Thusly, there has been a real need to find a way to effect the replacement of the subject seals which is labor and cost effective and which can be performed without removal or disassembly of the transmission.

In another, concurrent patent application of this inventor, there is disclosed a tool for removing oil retention seals from transmissions which requires neither the disassembly of the transmissions nor the removal of same from the automobile chassis.

The remaining problem, therefore, is to provide a mechanism and method for installing a new oil retention seal once the old one has been removed. The tool and method must be capable of accurately and squarely seating the seal, even if the servicing is performed while the transmission remains mounted to the automobile chassis. Consequently, the tool must also be readily useable within the spaces allowed underneath an automobile.

OBJECTS OF THE INVENTION

Accordingly, it is an object of the present invention to provide a tool and method for installing oil retention seals into automatic transmissions wherein neither the disassembly of the transmission nor the removal of the transmission from the automobile chassis is required.

It is another object of the present invention to provide a tool for installing oil retention seals of automatic transmissions, which tool can be used within the cramped confines underneath an automobile in the vicinity of its transmission.

Still another object of the present invention is to provide a tool which is both simple to use and inexpensive to manufacture.

Yet another object of the present invention is to make the replacement of oil retention seals easier and less expensive so that seals needing replacement are more likely to be replaced by reason of the lower costs of the repair.

It is yet another object of the present invention to provide a tool and method for installing oil retention seals which accurately and squarely seats the seal.

SUMMARY OF THE INVENTION

These and other objects are achieved by a seal installation tool constructed in accordance with the present invention which comprises a yoke having curved, lower camming surfaces and a handle, an apertured block rotatably secured within the yoke and a collar piece which is separate from the handle and the block. The apertures of the collar and the block are sized to slidingly receive the shift linkage piece extending from the transmission casing. The block is further provided with a set screw for locking the block onto the linkage piece. A hole through an arm of the yoke provides access to the head of the set screw.

In use, an oil retention seal is first slipped onto the linkage piece, followed by the collar and then the block, with all of the elements being urged towards the transmission casing such that the collar contacts the oil retention seal and the camming surfaces of the yoke contact the collar. At this point, the handle of the yoke is set at a ready position wherein the head of the set screw is accessible through the hole in the yoke. The set screw is then tightened to secure the block to the linkage piece. The handle is then manually leveraged such that the camming surfaces are brought to bear against the collar to urge it axially along the linkage piece against the seal. As a result, the seal is urged squarely into the seat provided in the transmission casing. The urging action is continued until a portion of the lower surface of the collar comes into contact with the transmission casing, whereupon further movement of the collar is prevented. At that point, the leveraging is discontinued, the set screw is loosened, and the handle and collar are removed, leaving the seal accurately seated in the transmission casing.

BRIEF DESCRIPTION OF THE DRAWINGS

The preferred embodiment of the present invention will be described with reference to the accompanying drawings wherein like members bear like reference numerals and wherein.

DETAILED DESCRIPTION OF THE PREFERRED EMBODIMENT

Figure 5:
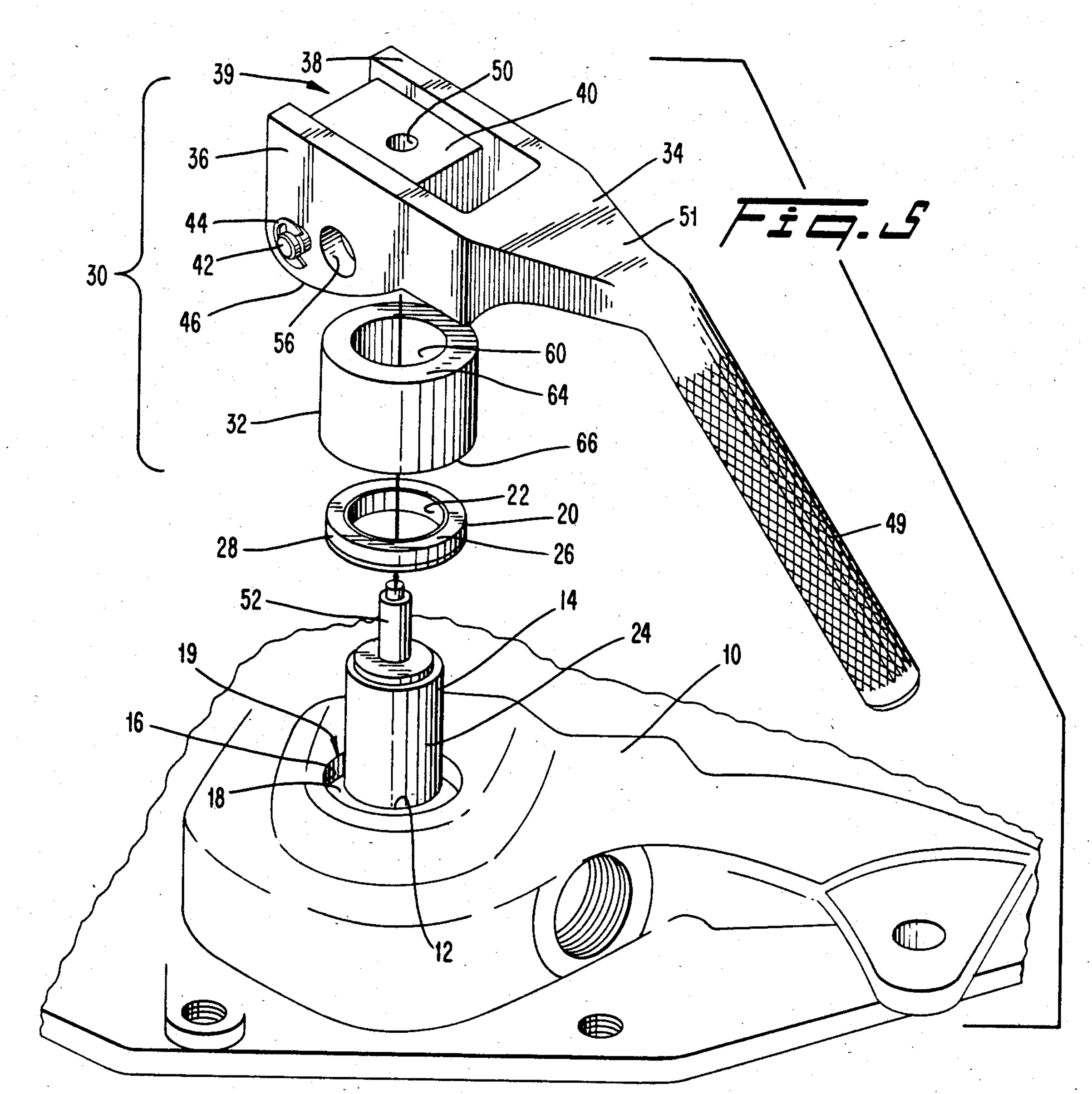
FIG. 5 is an exploded perspective view of the seal installation tool of FIG. 1 in conjunction with an oil retention seal and the portion of an automatic transmission casing where the seal is to be installed.

Referring to FIG. 5, there is shown a portion of a transmission casing 10 having a port 12 through which extends a cylindrical shift linkage piece 14. In the vicinity of the port 12, there are provided annular surfaces 16 and 18 which define a seat 19 for receiving an oil retention seal 20. It is to be understood that in FIG. 5, the shift linkage piece 14 has already been disconnected from the rest of the shift linkage which communicates the gear selector of the automobile with the transmission. During the operation of an automobile, the linkage piece 14 is moved axially and/or rotationally when a new gearing is selected by the driver. However, during the servicing of the transmission to replace the oil retention seal 20, the intermediate pieces of the shift linkage are removed. The remaining shift linkage piece 14 normally cannot be moved further into the transmission casing 10 than as shown in FIG. 5. Of course, the amount by which the linkage piece 14 extends into (or from) the transmission casing 10 during servicing might vary according to the model of transmission. Likewise, the specific geometry and size of the linkage piece 14 might also vary between models. For instance, the linkage piece 14 might be a straight cylindrical shaft instead of a stepped one as with the transmission casing 10.

The oil retention seal 20 comprises an inner annulus 22 of pliable material which circumferentially bears against the lower portion 24 of the shift linkage piece 14 when the seal 20 is positioned in the seat 19. Supporting the inner annulus 22 is an outer annulus 26 which is commonly constructed from a metal such as aluminum. When seated, the outer surface 28 of the outer annulus 26 bears against the surface 16 of the transmission casing 10.

Figure 1:
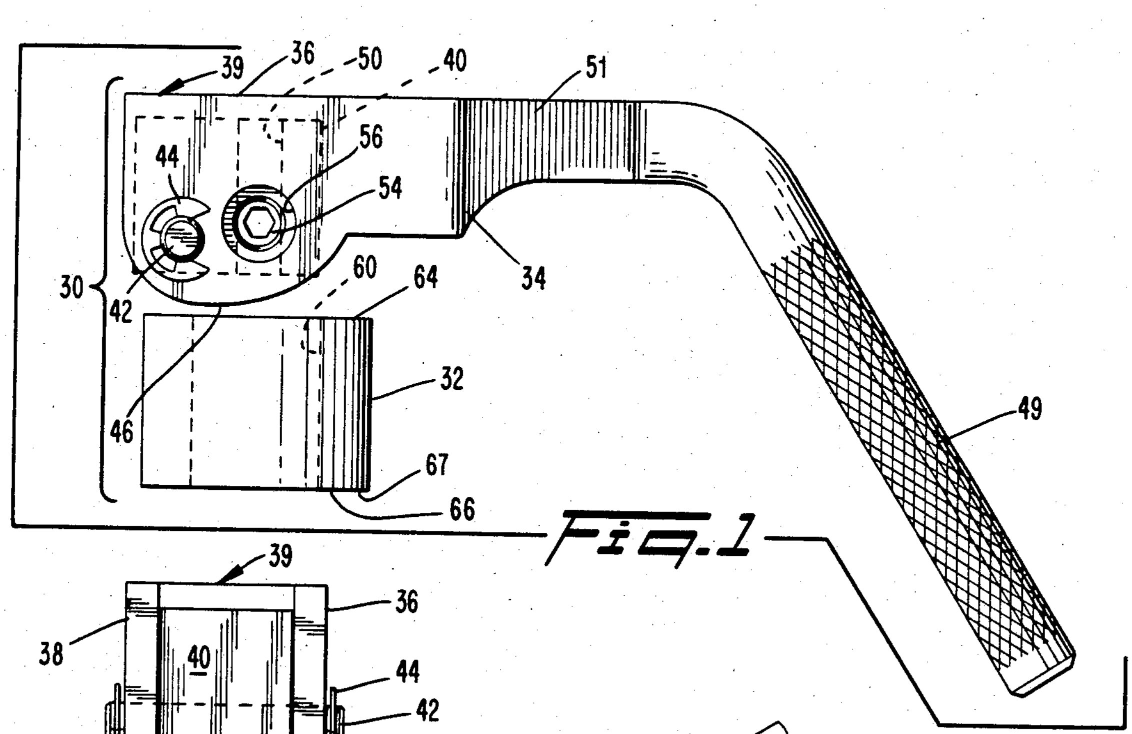
FIG. 1 is a side view of a seal installation tool constructed in accordance with the preferred embodiment of the present invention.

Referring now to FIGS. 1 and 5, the preferred embodiment of the present invention is a seal installation tool 30 comprising a separate collar piece 32 and a handle 34, which handle is forked at one end to provide two spaced apart arms 36 and 38. Arms 36 and 38 serve as a yoke 39 for receiving a block 40 which is rotatably secured between the arms 36 and 38 by a pin 42. The pin 42 is retained by lock rings 44 at both of its ends. At the undersides of arms 36 and 38 are twin camming surfaces 46 and 48.

Figure 7:
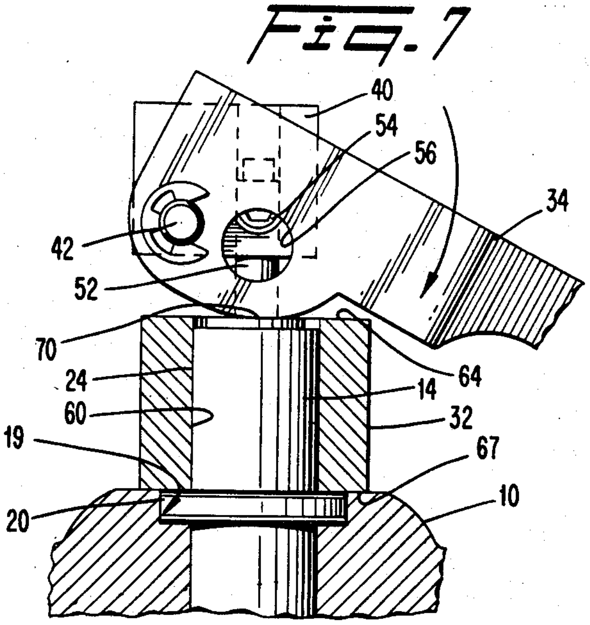
FIG. 7 is a partial, cross-sectional side view of the elements of FIG. 5 at the completion of the installation of the oil retention seal.

Preferably, the handle 34 and arms 36 and 38 are integrally formed and constructed from a tool steel. The handle 14 includes a knurled gripping portion 49 and a shank 51 positioned between the gripping portion 49 and the arms 36 and 38. The gripping portion 49 is thusly set apart from and placed at an obtuse angle with respect to the arms 36 and 38 such that the gripping portion 49 can be extended over the side of the transmission casing 10 with sufficient clearance from the casing 10 that the handle 14 can be leveraged downwardly as shown in FIG. 7 without interference. In this manner, the handle 14 can be used within the close confines underneath an automobile and is available to the user around the body and edges of the transmission casing 10.

Figure 3:
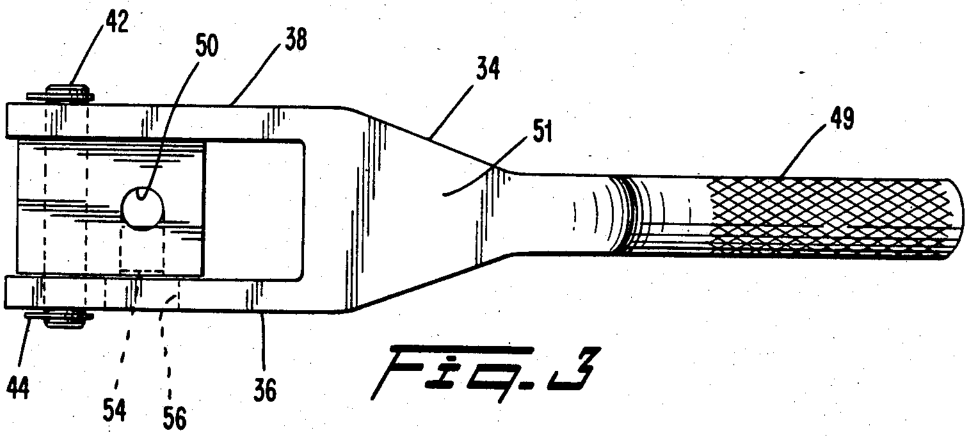
FIG. 3 is a top view of the seal installation tool of FIG. 1, but without the collar piece.

Extending through the block 40 is a bore 50 which is sized to slidingly receive the upper portion 52 of the linkage piece 14. The longitudinal axis of bore 50 is transverse to and lateral of the longitudinal axis of pin 42. It is to be noted that when the block 40 is in the position shown in FIG. 1, the camming surfaces 46 and 48 of the yoke 39 subtend the distance between the aforementioned axes of the bore 50 and the pin 42. Referring now also to FIG. 3, a set screw 54 is positioned within the block 40 such that it can be threaded transversely into and out of the bore 50. The set screw 54 is made sufficiently short to permit the set screw 54 to be fully retracted from the bore 59 without interfering with the ability of the yoke 39 to rotate with respect to the block 40. A lateral hole 56 is provided through the arm 36 to provide access to the head of the set screw 54 whenever the yoke 39 is in the position shown in FIG. 1.

The collar 32 is in the form of a thick washer having a central aperture 60 which is sized to slidingly receive the lower portion 24 of the linkage piece 14. The collar 32 includes an upper surface 64 for receiving the twin camming surfaces 46 and 48 of the yoke 39 and a lower surface 66 for bearing against an oil replacement seal 20. Preferably, the lower surface 66 is larger in diameter than the seal 20 so that the outer periphery 67 of the lower surfaces 66 protrudes beyond the seal 20 and will come into contact with the transmission casing 10 as the seal 20 becomes fully seated. In this manner, the lower, outer periphery 67 of the collar 32 serves as a stop to the action of the seal installation tool 30, whereas the inner portion of the surface 66 serves as a means for transferring forces from the twin camming surfaces 46 and 48 to the oil retention seal 20 as the seal is being installed.

Figure 2:
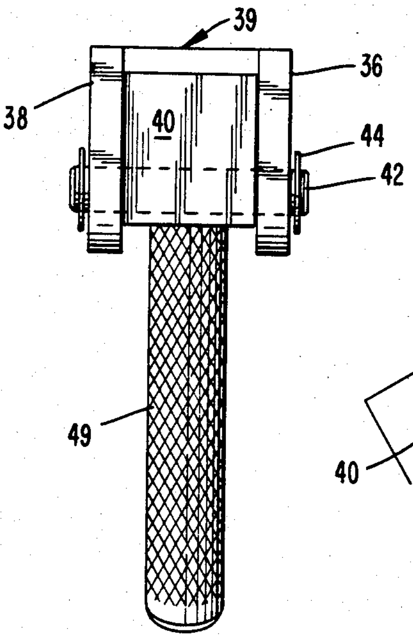
FIG. 2 is an end view of the seal installation tool of FIG. 1, but without the collar piece.
Figure 4:
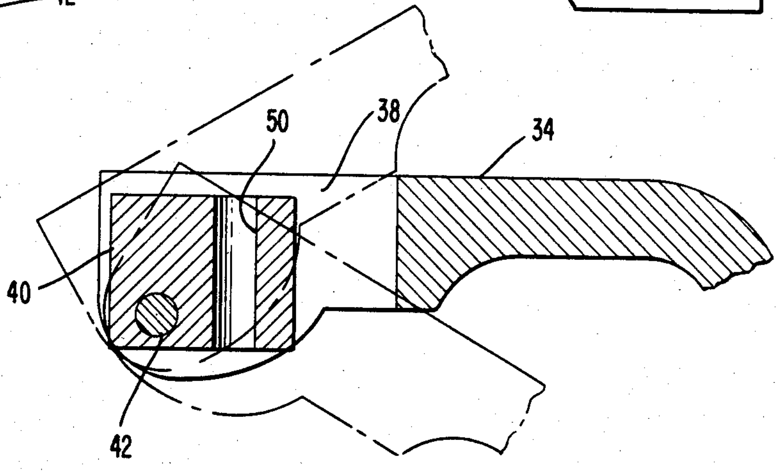
FIG. 4 is a partial side view of the seal installation tool of FIG. 1, with the yoke being rotated with respect to the block.

Referring now to FIGS. 2 and 4, a close, sliding fit is provided between the arms 36 and 38 and the block 40. Also, the yoke 39 and the block 40 are shaped so that they can remain in substantial contact throughout the normal angular displacement of the handle 34. These relationships maintain the proper alignment of the handle 34 with respect to the block 40 during leveraging. As a result, the forces imparted to the camming surfaces 46 and 48 from the grip 49 are distributed equally between the surfaces 46 and 48.

Figure 6:
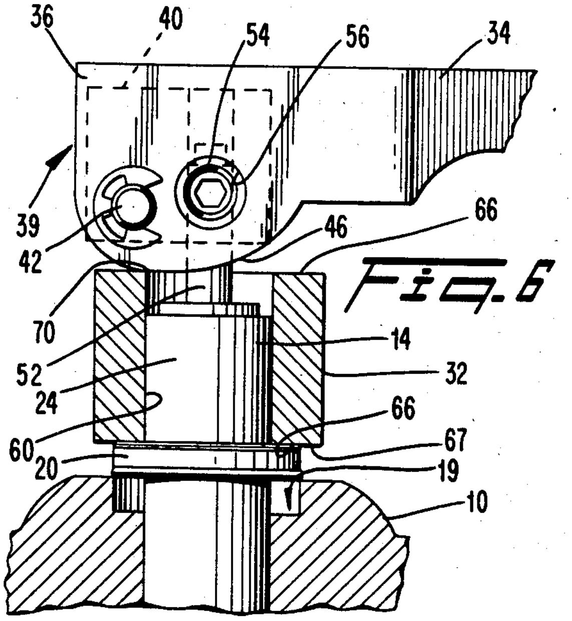
FIG. 6 is a partial, cross-sectional side view of the elements of FIG. 5 at a preliminary stage of the installation of the oil retention seal.

Referring now to FIGS. 6 and 7, the line of contact between the twin camming surfaces 46 and 48 and the upper surface 64 of the collar 32 appears as a point 70 in the subject drawings. At the initiation of the installation process (FIG. 6), the line of contact 70 is lateral of the longitudinal axis of the linkage piece 14. However, the twin camming surfaces 46 and 48 are shaped such that at or near the completion of the camming action, the line of contact 70 intersects or is close to intersecting the axis of the linkage piece 14. Consequently, just as the seating process is being completed (FIG. 7), the camming surfaces 46 and 48 impart forces to the oil retention seal 20 which avoid and/or correct any canting of the seal 20 in the seat 19. During the camming action, the sliding fit between the collar 32 and the linkage piece 14 also maintains the proper alignment of the collar 32. As a result of these relationships and because of the sliding fit between the yoke 39 and the block 40, the seal installation tool 30 seats the oil retention seal 20 accurately and squarely into the seat 19 of the transmission casing 10.

In the preferred embodiment, the collar 34 is given a length sufficient to allow the block 40 to be secured to the upper portion 52 of the linkage piece 14. In other models of transmissions, wherein the shift linkage piece might be a cylindrical shaft of constant diameter, the collar piece can be given a shorter length so that the action of the camming surfaces can be brought closer to the oil retention seal 20.

Referring now to FIG. 6, to effect the installation of an oil retention seal 20, the seal 20 is placed upon the shift linkage piece 14 and moved axially along the linkage piece 14 until it is positioned over the seat 19 of the transmission casing 10. The collar 32 is then placed upon the linkage piece 14 and moved axially along the linkage piece 14 until it contacts the oil retention seal 20. It is to be noted that during these steps, a proper alignment of the oil retention seal 20 and the collar 32 is maintained by the sliding fit between the linkage piece 14 and the collar 32 and the close fit between the linkage piece 14 and the oil retention seal 20. Next, the block 40 is placed upon the upper portion 52 of the shift linkage piece 14 and moved toward the collar 32 until the twin camming surfaces 46 and 48 contact the upper annular surface 64 with the handle 34 being positioned such that the set screw 54 is exposed through the lateral hole 56. The set screw 54 is then tightened to secure the yoke 39 to the shift linkage piece 14. Once so positioned, the handle 34 is then leveraged downwardly to impart an axially downwardly directed force upon the collar 32. This action, in turn, causes the oil retention seal 20 to be urged into the seat 19 of the transmission casing 10. This action continues until the outer periphery 67 of the lower surface 66 of the collar 32 contacts the transmission casing 10. At that point, the oil retention seal 20 is fully and squarely seated. The handle 34 is then returned to the position of FIG. 6 and the set screw 54 is loosened. Both pieces of seal installation tool 30 are then removed from the shift linkage piece 14 and are readied for further use or are stowed.

It is to be appreciated that through the use of the above described tool and method, the installation of an oil retention seal is achieved expediently and without disassembly of the transmission. The tool also permits servicing of the transmission while it remains mounted to the automobile chassis. Moreover, the tool is self-guiding and does not require the user to be able to directly observe the camming process, because the yoke 39 is secured to the linkage piece 14 during the camming operation and because the linkage piece 14 guides the collar 32 and the oil retention seal 20.

Variations and changes to the present invention will become readily apparent to one skilled in the art upon reading the present specification. Thus, it is to be understood that the present invention may be embodied in other specific forms without departing from the spirit or essential characteristics of the present invention. The preferred embodiment is therefore to be considered illustrative and not restrictive. The scope of the invention is indicated by the appended claims rather than by the foregoing descriptions and all changes or variations which fall within the meaning and range of the claims are therefore intended to be embraced therein.

What is claimed is:

1. A tool for installing an oil retention seal about a linkage piece extending into a transmission casing, said tool comprising:

a body having a smooth bore for receiving said linkage piece and means for temporarily securing said body to said received linkage piece;

a manually operable cam pivotally connected to said body; and a collar having an aperture to slidingly receive said linkage piece, said collar having a bearing surface for receiving said cam.

2. The tool as claimed in claim 1, wherein said collar includes a surface for contacting the transmission casing.

3. A tool for installing an oil retention seal about a linkage piece extending into a transmission casing, said tool comprising:

a manually operable cam with means for temporarily securing said cam to said linkage piece; and a collar having an aperture to slidingly receive said linkage piece, said collar having a bearing surface for receiving said cam and a surface for contacting the transmission casing;

said manually operable cam comprising a yoke with a handle and said means for temporarily securing said cam comprising a block rotatably secured to said yoke, said block having an aperture for receiving said linkage piece and a set screw for securing said block to said linkage piece.

4. A tool for installing oil retention seals about a linkage piece extending into a transmission casing, said tool comprising:

a yoke comprising a pair of parallel arms and a handle, each arm having a camming surface;

a block rotatably secured between said arms and having a bore sized to receive said linkage piece and a set screw for securing said block to said linkage piece; and a collar having an aperture sized to slidingly receive said linkage piece and a surface for receiving said camming surface.

5. The tool as claimed in claim 4, wherein said collar also includes a surface for contacting the transmission casing.

6. The tool as claimed in claim 5, wherein said block and said arms are slidingly fitted.

7. The tool as claimed in claim 6, wherein access to said set screw is through a hole provided in one of said arms.

* * * * *